(12) United States Patent
Logan et al.

(10) Patent No.: US 9,376,254 B2
(45) Date of Patent: Jun. 28, 2016

(54) METHODS FOR GRANULAR SCAVENGER MATERIAL TRANSFER

(75) Inventors: Gordon M. Logan, Aberdeen (GB); Jan Thore Eia, Kvernaland (NO); Martin Hunter, Hamilton (GB); Richard Bingham, Katy, TX (US); Colin Lauder, Richmond, TX (US)

(73) Assignees: M-I L.L.C., Houston, TX (US); M-I Drilling Fluids UK Limited, Aberdeen, Scotland (GB); SCHLUMBERGER NORGE AS, Tananger (NO)

( * ) Notice: Subject to any disclaimer, the term of this patent is extended or adjusted under 35 U.S.C. 154(b) by 940 days.

(21) Appl. No.: 13/146,369

(22) PCT Filed: Jan. 27, 2010

(86) PCT No.: PCT/US2010/022229
§ 371 (c)(1),
(2), (4) Date: Jul. 26, 2011

(87) PCT Pub. No.: WO2010/088270
PCT Pub. Date: Aug. 5, 2010

(65) Prior Publication Data
US 2011/0284027 A1 Nov. 24, 2011

Related U.S. Application Data

(60) Provisional application No. 61/147,714, filed on Jan. 27, 2009, provisional application No. 61/250,700, filed on Oct. 12, 2009.

(51) Int. Cl.
*B08B 7/04* (2006.01)
*B65D 88/30* (2006.01)
(Continued)

(52) U.S. Cl.
CPC . *B65D 88/30* (2013.01); *B08B 9/08* (2013.01); *B08B 9/093* (2013.01); *B63B 27/20* (2013.01);
(Continued)

(58) Field of Classification Search
None
See application file for complete search history.

(56) References Cited

U.S. PATENT DOCUMENTS 2,486,200 A * 10/1949 O'Connor .................... 222/564
2,826,313 A 3/1958 Payne et al.
(Continued)

FOREIGN PATENT DOCUMENTS

KR 10-388760 B1 10/2003
SU 119475 A1 11/1958
(Continued)

OTHER PUBLICATIONS

OneLook.com (http://www.onelook.com/?w=pneumatic&ls=a), accessed on Nov. 4, 2015.*
(Continued)

*Primary Examiner* — Eric Golightly
(74) *Attorney, Agent, or Firm* — Osha Liang LLP

(57) ABSTRACT

A method for cleaning a reactor, the method including circulating a fluid inside the reactor, pumping the fluid from the reactor into an inlet of a tank cleaner, and removing solids from the fluid to produce a clean fluid. The method further includes transferring the clean fluid to the reactor and transferring pneumatically the removed solids to a pressurized vessel. Also, a method for transferring spent granular material, the method including providing a vacuum system disposed at a hydrocarbon production site to remove spent material from a reactor, transferring the spent material through the vacuum system into a pressurized vessel, and conveying pneumatically the spent material from the pressurized vessel to a second pressurized vessel.

20 Claims, 12 Drawing Sheets

(51) Int. Cl.
| | |
|---|---|
| *B08B 9/08* | (2006.01) |
| *B08B 9/093* | (2006.01) |
| *B63B 27/00* | (2006.01) |
| *B63B 27/25* | (2006.01) |
| *B63B 27/34* | (2006.01) |
| *B65D 88/12* | (2006.01) |
| *B65D 88/32* | (2006.01) |
| *B65D 88/54* | (2006.01) |
| *B65D 90/00* | (2006.01) |
| *B65D 90/34* | (2006.01) |
| *B65D 90/36* | (2006.01) |
| *B01D 21/02* | (2006.01) |
| *B01D 21/26* | (2006.01) |

(52) U.S. Cl.
CPC ............... *B63B 27/25* (2013.01); *B63B 27/34* (2013.01); *B65D 88/128* (2013.01); *B65D 88/32* (2013.01); *B65D 88/54* (2013.01); *B65D 88/548* (2013.01); *B65D 90/0033* (2013.01); *B65D 90/34* (2013.01); *B65D 90/36* (2013.01); *B01D 21/02* (2013.01); *B01D 21/26* (2013.01); *B65D 2590/547* (2013.01)

(56) References Cited

U.S. PATENT DOCUMENTS

| | | | |
|---|---|---|---|
| 6,009,959 A | 1/2000 | Dietzen | |
| 6,179,071 B1 | 1/2001 | Dietzen | |
| 6,202,654 B1 | 3/2001 | Karlsson et al. | |
| 6,213,227 B1 | 4/2001 | Dietzen | |
| 6,866,050 B2 | 3/2005 | Engle | |
| 7,033,124 B2 | 4/2006 | Snowdon | |
| 7,172,685 B2 | 2/2007 | Thompson et al. | |
| 7,232,525 B2 | 6/2007 | Eriksen | |
| 8,480,812 B2 * | 7/2013 | Nath et al. | 134/22.1 |
| 2004/0052918 A1 * | 3/2004 | Briend et al. | 426/583 |
| 2005/0205114 A1 | 9/2005 | Alvarez et al. | |
| 2007/0187432 A1 | 8/2007 | Snowdon | |

FOREIGN PATENT DOCUMENTS

| | | | | |
|---|---|---|---|---|
| WO | 9613343 | A1 | 5/1996 | |
| WO | WO9727135 | * | 7/1997 | ............ B65G 53/12 |

OTHER PUBLICATIONS ahdictionary.com (https://www.ahdictionary.com/word/search.html?q=pneumatic), accessed on Nov. 4, 2015.*
collinsdictionary.com (http://www.collinsdictionary.com/dictionary/english/pneumatic), accessed on Nov. 4, 2015.*
dictionary.reference.com (http://dictionary.reference.com/browse/pneumatic?r=66), accessed on Nov. 4, 2015.*
Examiners Report issued in corresponding Argentine Application No. 2010 010 0206 with English Correspondence reporting the same; Dated Dec. 14, 2012 (3 pages).
International Search Report issued in PCT/US2010/022229, mailed on Aug. 27, 2010, 4 pages.
Written Opinion issued in PCT/US2010/022229, mailed on Aug. 27, 2010, 5 pages.
Examination Report issued in corresponding Canadian Application No. 2,750,562; Dated Mar. 7, 2013 (4 pages).
Office Action issued in corresponding Mexican Application No. MX/a/2011/007883 with English reporting thereof dated Apr. 22, 2014 (8 pages).
Examination Report issued in corresponding Argentine Application No. 2010 010 0206 with English reporting thereof dated Jul. 31, 2013 (10 pages).
Office Action issued in corresponding Canadian Application No. 2,750,562 dated Oct. 18, 2013 (2 pages).
Office Action issued in corresponding Mexican Application No. MX/a/2011/007883 with English reporting thereof dated Oct. 31, 2013 (4 pages).
Official Action issued in corresponding Eurasian Application No. 201170985/31 with English translation dated Feb. 3, 2014 (4 pages).
Official Action issued in Eurasian Application No. 201170985/31; dated Oct. 13, 2014 (2 pages).
Official Action issued in Mexican Application No. MX/a/2011/007883 with English reporting thereof; dated Oct. 24, 2014 (10 pages).
Office Action issued in corresponding Canadian Application No. 2,750,562; Dated Jun. 20, 2014 (2 pages).

* cited by examiner

METHODS FOR GRANULAR SCAVENGER MATERIAL TRANSFER

BACKGROUND

1. Field of the Disclosure

Embodiments disclosed herein generally relate to the transport of bulk materials to and from process locations. More specifically, embodiments disclosed herein relate to methods for transferring granular scavenger material between pressurized containers. More specifically still, embodiments disclosed herein relate to methods for transferring granular $H_2S$ scavenger material between pressurized containers as a dense phase. Even more specifically, embodiments disclosed herein relate to methods for transferring both unused and spent granular material between pressurized vessels disposed on land-based facilities, offshore supply vessels, and offshore production platforms.

2. Background Art

Drilling and production of oil or gas wells often requires granular materials to be taken to and removed from drilling and production locations both onshore and offshore. Examples of such granular materials be taken to such locations include fluid additives for drilling and completing a well and hydrogen sulfide treatment material for production of a well. Examples of material removed from drilling locations include dried cuttings and from production locations, spent hydrogen sulfide treatment material.

Some materials tend to be relatively fragile and bulk transport of these materials is often limited to bags so that the material is held in a stable position and does not get crushed to the extent that it would in a bulk container or truck. Due to this limitation, certain materials aren't routinely used offshore because it is difficult logistically to get the material onto an offshore rig. Further, storage on offshore rigs is quite limited and storing bags of material is not practical.

One type of granular material includes, granular hydrogen sulfide ("$H_2S$") scavenger material, that may be transferred from supply vessels to offshore production vessels, where the granular scavenger material is used to remove $H_2S$ from produced gaseous hydrocarbons, such as natural gas or off-gas production fluids. Typically, the transfer of granular $H_2S$ scavenger material occurs through the transfer of boxes or bags of dry material to supply vessels via crane lifts, gravity tanks, and conveyor belts. Depending on the volume of granular $H_2S$ scavenger material required for a specific operation, the number of crane lifts may be substantial. For example, in a typical operation, several hundred crane lifts may be required to transfer sufficient granular $H_2S$ scavenger material from a land-based facility to a boat. Additional crane lifts may be required to transfer material from the boat to the rig, and still more crane lifts may be required to return spent material to shore.

After the scavenger materials are transferred to the offshore location, the scavenger materials may be transferred or pumped to an offshore platform for use in a reactor to remove $H_2S$. In offshore operations, depending on the volume of scavenger required, a supply vessel may have to make several trips, returning to a land-based facility each time, to procure additional granular scavenger material. Each time a supply vessel leaves an offshore platform to procure additional supplies, the drilling/production operation incurs additional expenses including the cost of transporting the granular scavenger material, fuel costs associated with trips to shore, and lost time, as each trip to shore and then back to the drilling and/or production platform may require several days.

In addition to requiring numerous crane lifts and/or vessel transfers, procurement and then transportation of granular $H_2S$ scavenger material to and from an offshore platform require time consuming and dangerous operations to clean spent scavenger material from the reactor. The conventional method of cleaning the reactor involves the use of hand tools and manually controlled water lances to break the material out of the vessel. Such operations may require personnel to undertake hazardous work.

Accordingly, there exists a need for methods of transferring scavenger materials to and from drilling rigs, as well as methods and apparatuses for holding bulk granular material so that it may be transferred to or from an offshore location.

SUMMARY OF THE DISCLOSURE

In one aspect, embodiments disclosed herein relate to a method for cleaning a reactor, the method including circulating a fluid inside the reactor, pumping the fluid from the reactor into an inlet of a tank cleaner, and removing solids from the fluid to produce a clean fluid. The method further includes transferring the clean fluid to the reactor and transferring pneumatically the removed solids to a pressurized vessel.

In another aspect, embodiments disclosed herein relate to a method for transferring spent granular material, the method including providing a vacuum system disposed at a hydrocarbon production site to remove spent material from a reactor, transferring the spent material through the vacuum system into a pressurized vessel, and conveying pneumatically the spent material from the pressurized vessel to a second pressurized vessel.

In another aspect, embodiments disclosed herein relate to a method for transferring scavenger material, the method including providing a first pressurized vessel containing granular scavenger materials, connecting the first pressurized vessel to a second vessel, and transferring pneumatically, scavenger material from the first pressurized vessel to the second vessel.

In another aspect, embodiments disclosed herein relate to a vessel for holding bulk material, the vessel comprising a tank disposed in a frame, wherein the tank comprises a plurality of gravity feed inlets; one or more pneumatic feed inlets; and a gravity outlet; as well as, a plurality of for truck lifting pockets.

Other aspects and advantages of the invention will be apparent from the following description and the appended claims.

DETAILED DESCRIPTION

In one aspect, embodiments disclosed herein relate to methods for transferring granular scavenger materials between pressurized containers. More specifically, embodiments disclosed herein relate to methods for transferring granular scavenger materials between pressurized containers as a dense phase. More specifically still, embodiments disclosed herein also relate to methods for transferring granular $H_2S$ scavenger materials between pressurized containers disposed on land-based facilities, offshore supply vessels, and offshore production platforms.

Figure 1:
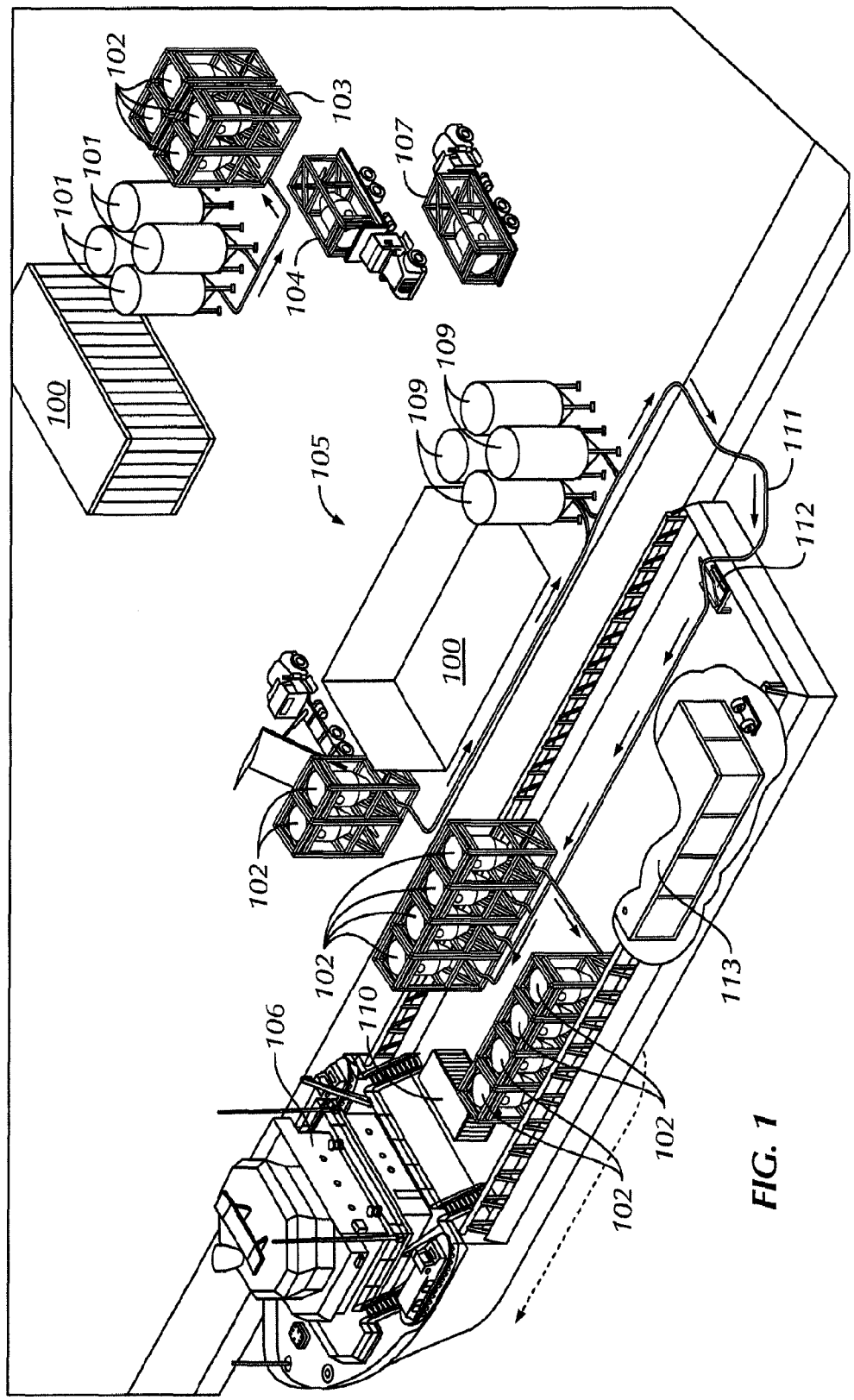
FIG. 1 is a schematic representation of granular $H_2S$ scavenger material transfer from a land-based facility to a supply vessel according to embodiments of the present disclosure.

Referring initially to FIG. 1, a schematic representation of granular $H_2S$ scavenger material transfer from a land-based facility to a supply vessel according to embodiments of the present disclosure is shown. In this embodiment, granular $H_2S$ scavenger material is originally manufactured at a plant 100. At the plant 100, granular scavenger materials may be stored in bulk storage tanks 101 before being loaded into pressurized containers 102. Exemplary pressurized containers will be discussed in detail below, but those of ordinary skill in the art will appreciate that any type of pressurized container capable of allowing for the transport of wet or dry materials may be used. Preferably, the pressurized containers will be in an international standard organization ("ISO") frame 103, thereby increasing the ease of transport.

After the pressurized containers 102 are filled with granular scavenger material, the pressurized containers 102 may be loaded onto trucks 104 and transported to a land-based loading facility 105. At the land-based loading facility 105, the pressurized containers 102 may be unloaded from trucks 104. The pressurized containers 102 may then be fluidly connected to additional pressurized containers 102 located on a supply vessel 106. Air may then be forced into pressurized containers 102, thereby allowing for the pneumatic transfer of the granular scavenger material from the pressurized containers 102 at the land-based loading facility 105 to the pressurized containers 102 disposed on supply vessel 106. Similarly, in certain embodiments, materials, such as excess granular scavenger material, may be transferred from pressurized containers 102 disposed on supply vessel 106 to the pressurized containers 102 located at the land-based loading facility 105. After the pressurized containers 102 located at the land-based loading facility 105 are empty, or otherwise filled with other materials, such as excess granular scavenger material, the pressurized containers 102 may be transported back to manufacturing plant 100 or to other locations via trucks 107.

In addition to the loading of granular $H_2S$ scavenger materials from the land-based loading facility 105 into pressurized containers 102 on supply vessel 106, dry chemicals from a chemical storage area 108 or wet chemicals and/or water from containers 109 may also be transferred onto supply vessel 106. The transfer of such additional materials may be via pneumatic transference between pressurized containers 102, or in certain embodiments, may be through conventional suction transference through the use of an air compressor 110 located on supply vessel 106. The determination of the type of transference may depend in part on the type of the materials being transferred, as well as the type of equipment available at a given facility. For example, if the facility is equipped with pressurized containers 102 capable of transferring both wet and dry materials pneumatically as a dense phase, the materials may be transferred using such containers. However, in certain embodiments, the wet and/or dry chemicals may not require the same care of handling as the granular scavenger material does. In such embodiments, traditional suction or lean phase transference may be an alternative to the dense phase transference of materials via pressurized containers 102.

Transference of materials from land-based loading facility 105 to supply vessel 106, whether using lean or dense phase transference, may occur by running a hose 111 from pressurized containers 102 located at the land-based facility 105 to the supply vessel 106. Supply vessel 106 may also include a tilt table 112 to enhance the flow of materials from the land-based facility 105 to supply vessel 106. Such tilt tables 112 may be used to connect and regulate the flow of air and/or materials through hose 111, and thereby control the flow of material between pressurized containers 102 and/or storage containers 108 and 109.

On the supply vessel 106, water may be transferred to a water storage container or vessel hull tank 113, while chemicals and granular scavenger materials may be transferred to pressurized containers 102. Those of ordinary skill in the art will appreciate that in certain embodiments, multiple hoses 111 may be run between land-based facility 105 and supply vessel 106, thereby increasing the speed of loading and unloading water, chemicals, and granular scavenger material. Thus, in certain aspects, both pneumatic transference of materials using pressurized containers 102 and traditional suction transference may be used to load and unload supply vessel 106.

Figure 2:
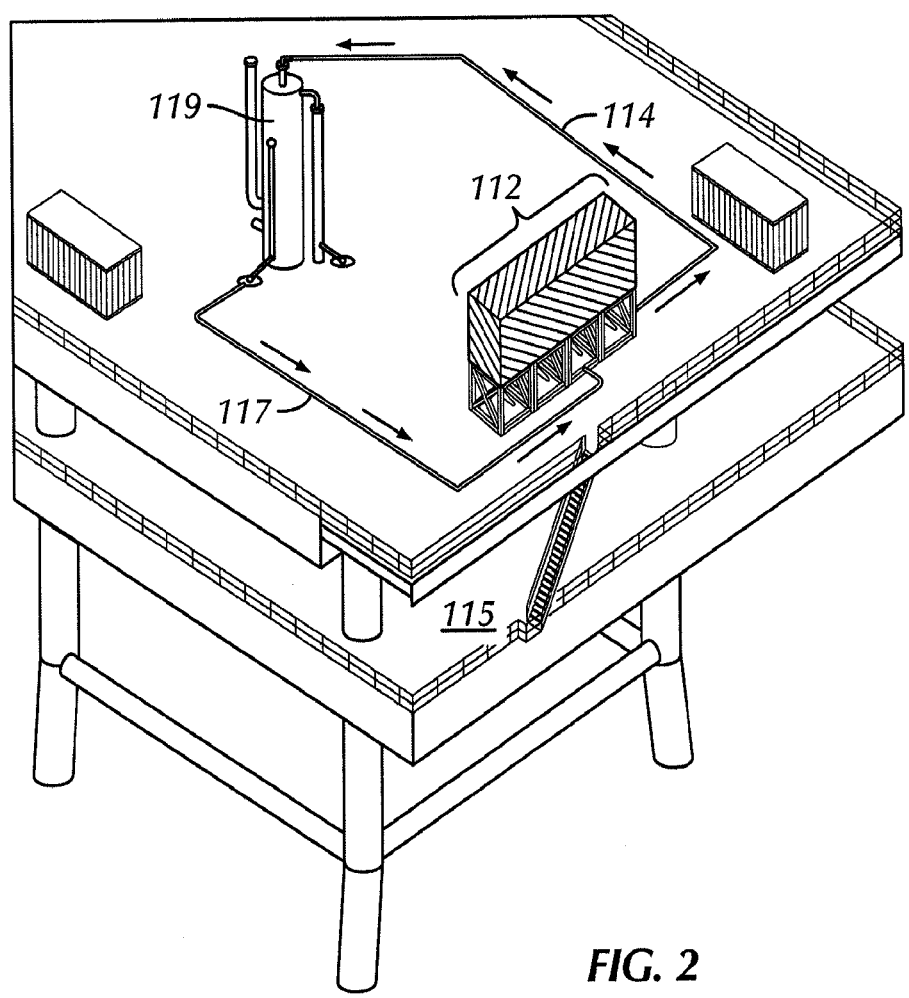
FIG. 2 is a schematic representation of fluid transfer for a cleaning process between a reactor and an automatic tank cleaning system according to embodiments of the present disclosure.

Referring to FIG. 2, a schematic representation of fluid transfer between a reactor and an automatic tank cleaning system located on a production platform according to embodiments of the present disclosure is shown. Those of ordinary skill in the art will appreciate that systems in accordance with the present disclosure may be disposed on both fixed platform offshore production facilities, as well as floating offshore production facilities. In this embodiment, a reactor 119 and an automatic tank cleaning system 112 are located proximate one another on a production platform 115. In certain embodiments, the reactor 119 may initially be filled with clean fluid, such as water. In other embodiments, reactor 119 may be filled with a gas, such as an inert gas, or may be substantially empty prior to cleaning. Reactor 119 includes a vessel that may be used to remove impurities such as $H_2S$ from gaseous hydrocarbons or off-gas produced from a well. Additionally, the reactor 119 may contain membranes/filters and provide scavenger materials for the removal of entrained $H_2S$.

As gaseous hydrocarbons undergo processing in the reactor 119, scavenger materials and filters become exhausted from use, thereby limiting the efficiency of the reactor 119. As such, the spent scavenger materials and filters may require removal from the reactor 119, and the reactor 119 may require cleaning. Additionally, the spent scavenger materials may be transferred to empty pressurized vessels (not shown) or cuttings boxes (not shown) for disposal. Typically, a reactor 119 may process fluids and gases returning from a well for several hours or even days before cleaning may be required. Those having ordinary skill in the art will appreciate that the timing of the cleaning cycle or cleaning phase may depend in part on the type of reactor 119, including the type of filter that is being used, as well as the volume and type of fluid and/or gas processed in the unit. Those of ordinary skill in the art will also appreciate that any type of reactor capable of allowing for the separation and process of fluids and gases may be used.

After fluid is pumped and circulated inside the reactor 119, the fluid may be allowed to drain to a bottom outlet (not shown) of the reactor 119, where the fluid is collected and transferred to automatic tank cleaning system 112. Initially, a hose 117 is run between reactor 119 and the automatic tank cleaning system 112 to allow for the transference of spent fluid therebetween. Automatic tank cleaning system 112 may be used to wash/clean reactor 119 and recover clean fluid therefrom. Furthermore, a hose 114 may also be run between the automatic tank cleaning system 112 and reactor 119 to allow for the transference of clean fluid therebetween. Through the use of a pump (not shown), the clean fluid may be reintroduced to the reactor 119. An exemplary tank cleaning system 112 that may be used according to embodiments disclosed herein includes an automatic tank cleaner, such as that disclosed in U.S. Pat. No. 7,232,525, to M-I LLC, Houston, Tex., and hereby incorporated by reference in its entirety.

Figure 3A:
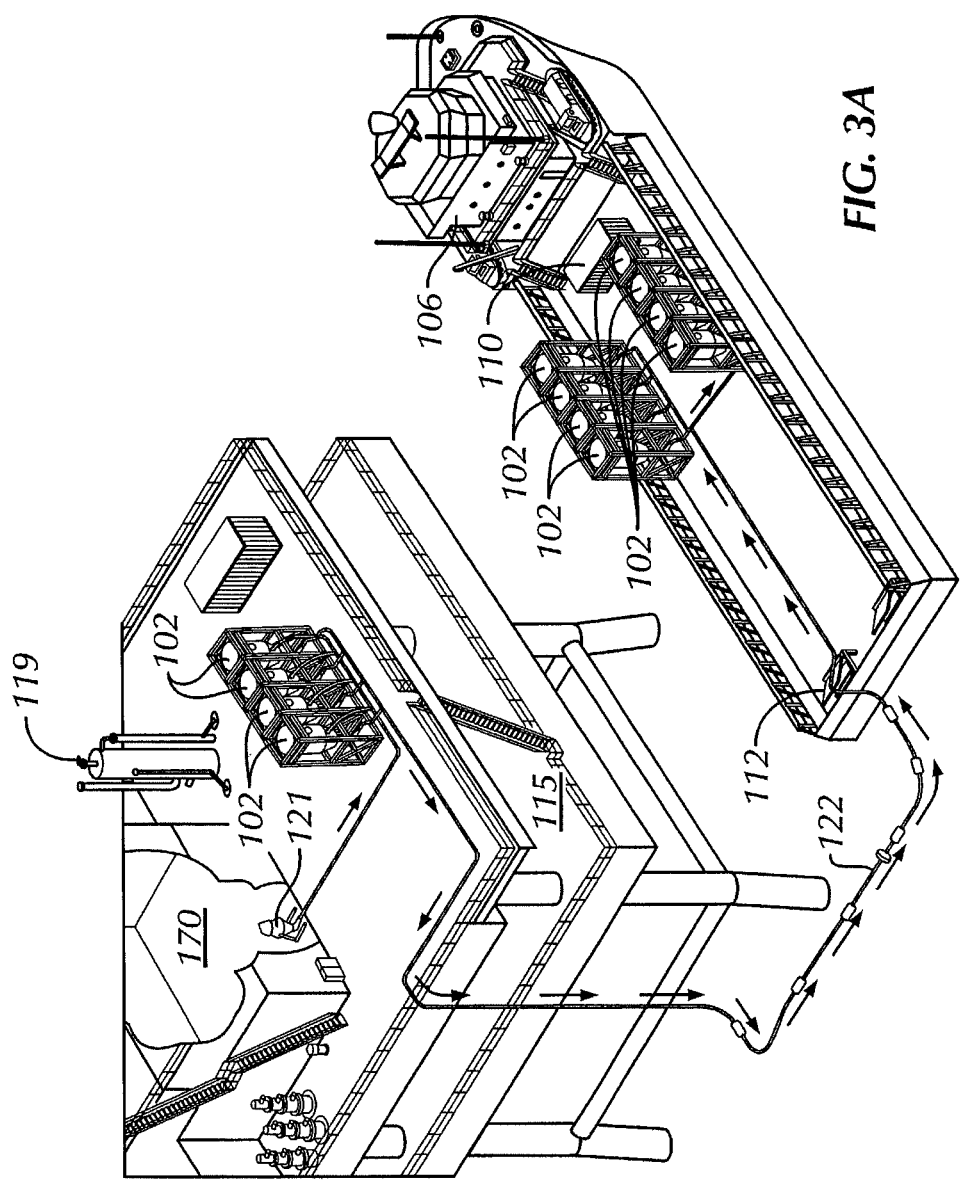
FIG. 3A is a schematic representation of spent $H_2S$ scavenger material transfer between a supply vessel and an offshore platform according to embodiments of the present disclosure.
Figure 3B:
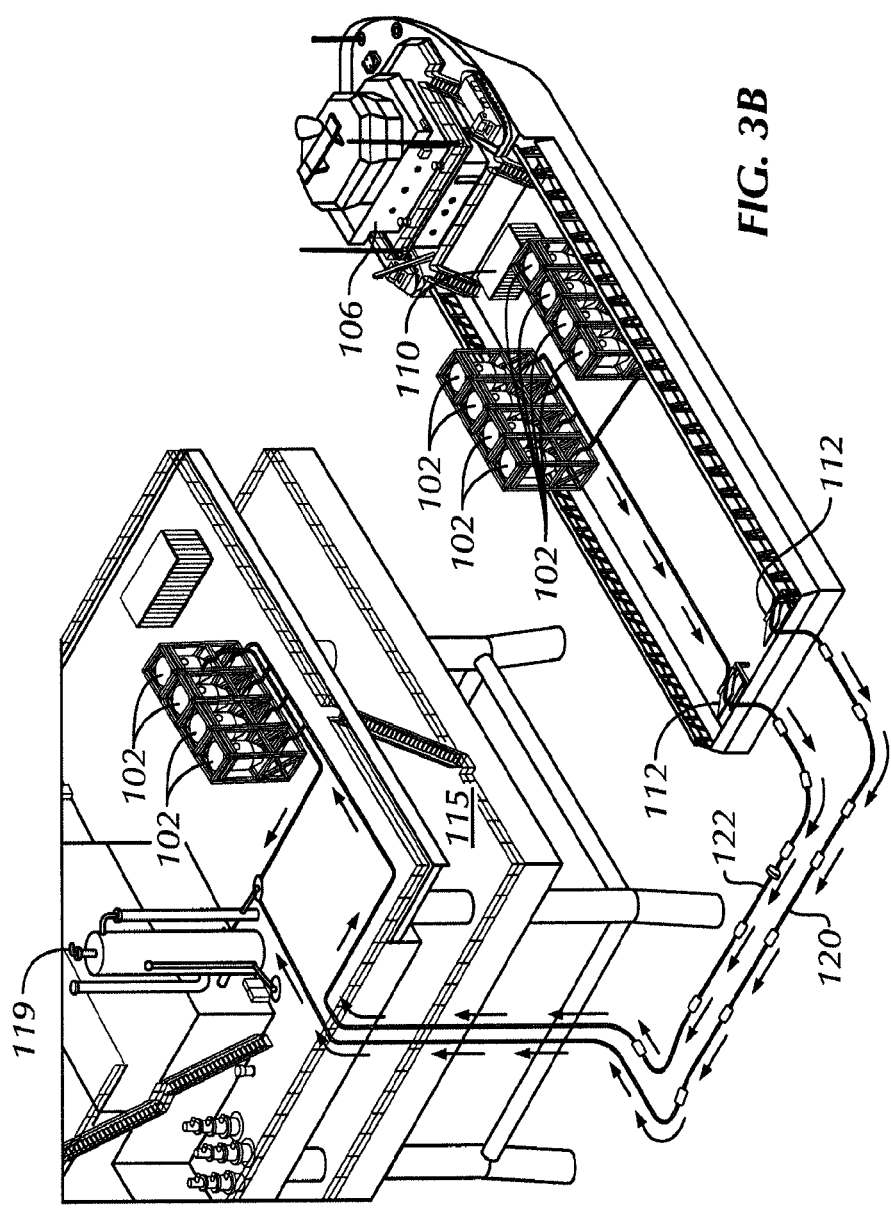
FIG. 3B is a schematic representation of granular $H_2S$ scavenger material transfer between a supply vessel and an offshore platform according to embodiments of the present disclosure.

Referring now to FIGS. 3A and 3B, transference methods according to aspects of the present disclosure are shown. Specifically, FIG. 3A illustrates the transference of spent material from a production platform 115 to a supply vessel 106, while FIG. 3B shows the transference of granular $H_2S$ scavenger material from a supply vessel 106 to a production platform 115.

Referring to FIG. 3A, a schematic representation of spent scavenger material transfer between a production platform 115 and a supply vessel 106 according to embodiments of the present disclosure is shown. In this embodiment, a supply vessel 106 including pressurized containers 102 is located proximate a production platform 115. A hose 122 is run between supply vessel 106 and production platform 115 to allow for the transference of spent material therebetween. Initially, spent material is transferred by vacuum system 170 from reactor 119 to a pressurized transference device 121 for transference pneumatically to pressurized containers 102 located on production platform 115. Thereafter, as discussed above, when cleaning the reactor 119, spent scavenger material is transferred from a pressurized vessel 102 on production platform 115 via hose 122 to pressurized containers 102 on supply vessel 106. Those of ordinary skill in the art will appreciate that in other embodiments, pressurized vessel 102 located on supply vessel 106 may be replaced with a cuttings box (not shown), thereby allowing the transference of spent material to a non-pressurized container.

As gaseous hydrocarbons are injected into the reactor 119 and $H_2S$ is absorbed by the granular scavenger material, the granular scavenger material often becomes exhausted and forms as a crystallized material (spent material) along the walls of the reactor 119. Such crystallized material forms into a cement; and may require the use of a highly pressurized fluid for removal. Typically, the fluid is supplied at pressures between 20 to 40 gpm of water to ensure removal of material from the reactor 119.

Furthermore, to remove the spent material, a vacuum hose (not shown) may be lowered into reactor 119. A vacuum system 170 may include one or more vacuum tanks, vacuum hoses, and a power skid that is configured to transfer the spent scavenger material by suction. After the spent scavenger material is collected by vacuum system 170, the materials may be directed to a pressurized transference device 121. An example of a pressurized transference device 121 that may be used according to embodiments disclosed herein include a cuttings blower, disclosed in U.S. Pat. Nos. 6,009,959 and 6,213,227, to M-I LLC, Houston, Tex., and hereby incorporated by reference in their entirety.

As the collected spent materials are transferred from reactor 119 to the pressurized transference device 121, the pressurized transference device 121 may be actuated so as to transmit the spent materials to pressurized containers 102. In one aspect, as illustrated, the pressurized transference device 121 may transfer the recovered materials to pressurized containers 102 disposed on production platform 115; however, in other aspects, pressurized transference device 121 may transfer the spent materials directly to pressurized vessels 102 located on a supply vessel 106. The spent materials may thereafter be sent back to a land-based facility for disposal.

In one embodiment, the collected spent materials are initially transferred from the reactor 119 to pressurized transference device 121 and thus to pressurized containers 102 on production platform 115. The collected materials are then transferred via hose 122 to pressurized containers 102 located on supply vessel 106. Those of ordinary skill in the art will appreciate that because the collected materials may be wet, and not dry, like the granular scavenger materials discussed above, the transference may be either lean phase or dense phase transference. Furthermore, the collected material may be pneumatically transferred through the use of compressors 110 to pressurized containers 102 on either supply vessel 106 or production platform 115 (not shown), and may be regulated through the use of tilt tables 112, as explained above.

Referring to FIG. 3B, a schematic representation of granular $H_2S$ scavenger material transfer between a supply vessel 106 and a production platform 115 according to embodiments of the present disclosure is shown. In this embodiment, unused (fresh) granular $H_2S$ scavenger material may be pneumatically conveyed from supply vessel 106 to containers 102 located on production platform 115. After pressurized containers 102 on production platform 115 are filled with fresh granular $H_2S$ scavenger material from pressurized containers 102 on supply vessel 106, reactor 119 may be filled with the materials supplied to pressurized containers 102 on production platform 115. The materials supplied to reactor 119 may be used when processing gaseous hydrocarbons that are injected in the reactor 119 during $H_2S$ removal.

In other aspects, reactor 119 may be filled with fresh granular scavenger material via pneumatic transference directly from pressurized container 102 located on supply vessel 106. In certain aspects, prior to the transference of fresh granular $H_2S$ scavenger material to reactor 119, the reactor 119 may be purged with nitrogen, argon, or helium to ensure that the vessel is dry, thereby preventing the use of a wet scavenger material and/or damaging the material. While in this aspect the containers on production platform 115 are illustrated as pressurized containers 102, those of ordinary skill in the art will appreciate that in certain embodiments, the containers may not be pressurized. Thus, supply vessel 106 may use dense phase transference to transmit dry granular $H_2S$ scavenger material from supply vessel 106 to pressurized containers 102 on production platform 115, or as lean phase transference from supply vessel 106 to non-pressurized containers (not shown) on production platform 115.

In other aspects, supply vessel 106 may use dense phase transference to transmit granular $H_2S$ scavenger materials from supply vessel 106 to additional pressurized containers 102 on production platform 115. Such additional pressurized containers 102 may be used to store excess dry scavenger materials at the production site, or alternatively, may be used to store material for larger operations. Such transference may occur through actuation of a compressor 110 on supply vessel 106, and regulated by a tilt table 112, as described above.

According to the methods of transferring granular $H_2S$ scavenger materials between land-based facilities, supply vessels, and production platforms discussed above, various modifications to the process may occur due to, for example, the availability of equipment. In certain aspects, pressurized containers may be filled with dry granular scavenger materials at a manufacturing facility, then the pressurized containers may be disposed directed onto a supply vessel through crane lifts. In other aspects, granular $H_2S$ scavenger materials may be stored at a land-based facility, then transferred to pressurized containers using, for example, a pressurized transference device, and then loaded onto a supply vessel via crane lifts. In either aspect, pressurized containers containing dry granular scavenger may be provided to a supply vessel.

Pressurized containers may include varying designs and configurations, so long as the pressurized containers allow for the pneumatic transference of dry materials. More specifically, the pressurized containers are configured to allow for the positive pneumatic transference of materials between a first pressurized container and a second container, whether the second container is a pressurized container or includes an atmospheric receiving chamber. Several examples of pressurized containers that may be used according to embodiments of the present disclosed are discussed in detail below.

Figure 4A:
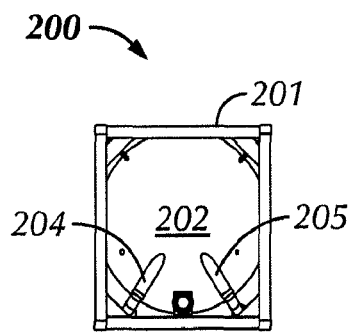
FIG. 4A shows a top view of a pressurized container according to embodiments of the present disclosure.
Figure 4B:
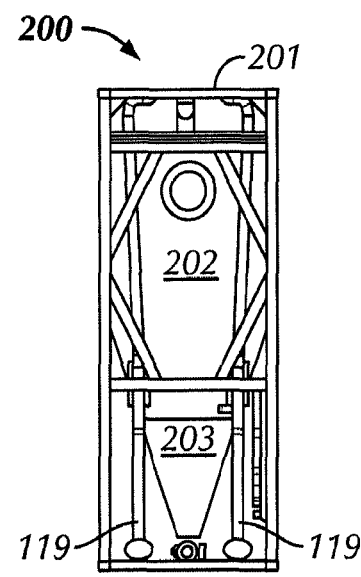
FIG. 4B shows a side view of a pressurized container according to embodiments of the present disclosure.
Figure 4C:
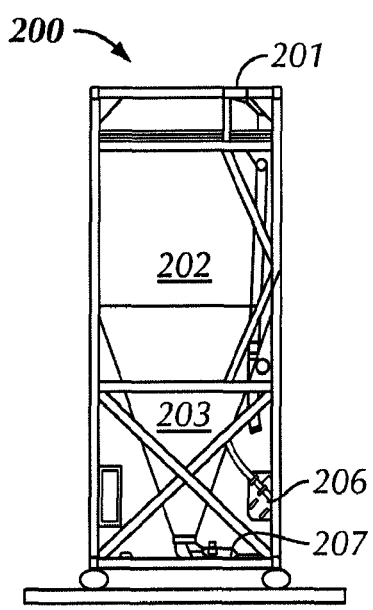
FIG. 4C shows a side view of a pressurized container according to embodiments of the present disclosure.

Referring to FIGS. 4A through 4C, a pressurized container according to embodiments of the present disclosure is shown. FIG. 4A is a top view of a pressurized container, while FIGS. 4B and 4C are side views. One type of pressurized vessel that may be used according to aspects disclosed herein includes an ISO-PUMP™, commercially available from M-I LLC, Houston, Tex. In such an embodiment, a pressurized container 200 may be enclosed within a support structure 201. Support structure 201 may hold pressurized container 200 to protect and/or allow the transfer of the container from, for example, a supply boat to a production platform. Generally, pressurized container 200 includes a vessel 202 having a lower angled section 203 to facilitate the flow of granular scavenger materials between pressurized container 200 and other processing and/or transfer equipment (not shown). A further description of pressurized containers 200 that may be used with embodiments of the present disclosure is discussed in U.S. Pat. No. 7,033,124, assigned to the assignee of the present application, and hereby incorporated by reference herein. Those of ordinary skill in the art will appreciate that alternate geometries of pressurized containers 200, including those with lower sections that are not conical, may be used in certain embodiments of the present disclosure.

Pressurized container 200 also includes a material inlet 204 for receiving granular scavenger material, as well as an air inlet and outlet 205 for injecting air into the vessel 202 and evacuating air to atmosphere during transference. Certain containers may have a secondary air inlet 206, allowing for the injection of small bursts of air into vessel 202 to break apart dry materials therein that may become compacted due to settling. In addition to inlets 204, 205, and 206, pressurized container 200 includes an outlet 207 through which dry granular scavenger materials may exit vessel 202. The outlet 207 may be connected to flexible hosing, thereby allowing pressurized container 200 to transfer materials, such as dry granular scavenger material, between pressurized containers 200 or containers at atmosphere.

Figure 5A:
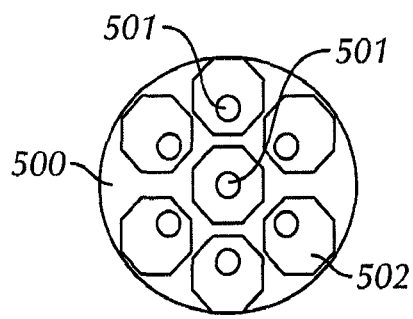
FIG. 5A shows a cross-sectional view of a pressurized container according to embodiments of the present disclosure.
Figure 5B:
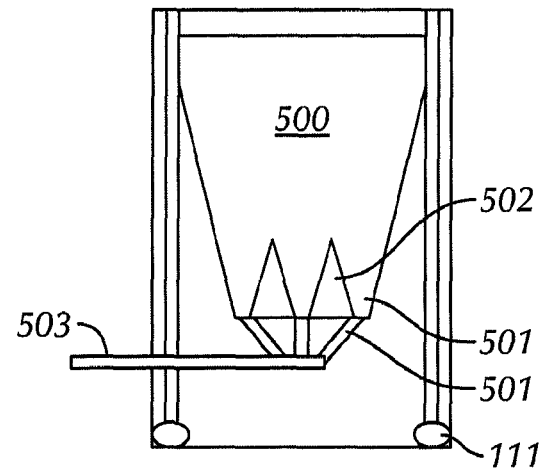
FIG. 5B shows a side view of a pressurized container according to embodiments of the present disclosure.
Figure 5C:
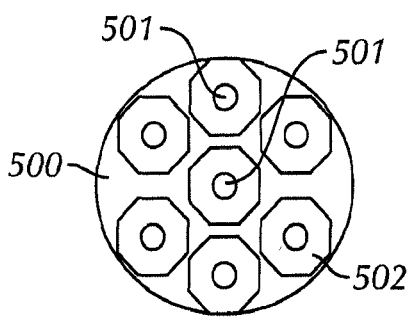
FIG. 5C shows a cross-sectional view of a pressurized container according to embodiments of the present disclosure.
Figure 5D:
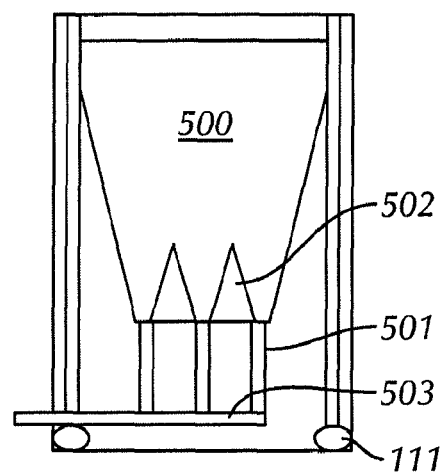
FIG. 5D shows a side view of a pressurized container according to embodiments of the present disclosure.

Referring to FIGS. 5A through 5D, a pressurized container 500 according to embodiments of the present disclosure is shown. FIGS. 5A and 5C show top views of the pressurized container 500, while FIGS. 5B and 5D show sides views of the pressurized container 500.

Referring now specifically to FIG. 5A, a top schematic view of a pressurized container 500 according to an aspect of the present disclosure is shown. In this embodiment, pressurized container 500 has a circular external geometry and a plurality of outlets 501 for discharging granular scavenger material therethrough. Additionally, pressurized container 500 has a plurality of internal baffles 502 for directing a flow of granular $H_2S$ scavenger material to a specific outlet 501. For example, as granular scavenger materials are transferred into pressurized container 500, the materials may be divided into a plurality of discrete streams, such that a certain volume of material is discharged through each of the plurality of outlets 501. Thus, pressurized container 500 having a plurality of baffles 502, each corresponding to one of outlets 501, may increase the efficiency of discharging granular scavenger materials from pressurized container 500.

During operation, granular $H_2S$ scavenger materials transferred into pressurized container 500 may exhibit plastic behavior and begin to coalesce. In traditional transfer vessels having a single outlet, the coalesced materials could block the outlet, thereby preventing the flow of materials therethrough. However, the present embodiment is configured such that even if a single outlet 501 becomes blocked by coalesced material, the flow of material out of pressurized container 500 will not be completely inhibited. Moreover, baffles 502 are configured to help prevent granular scavenger materials from coalescing. As the materials flow down through pressurized container 500, the material will contact baffles 502, and divide into discrete streams. Thus, the baffles 502 that divide materials into multiple discrete steams may further prevent the material from coalescing and blocking one or more of outlets 501.

Referring to FIG. 5B, a cross-sectional view of pressurized container 500 from FIG. 5A according to one aspect of the present disclosure is shown. In this aspect, pressurized container 500 is illustrated including a plurality of outlets 501 and a plurality of internal baffles 502 for directing a flow of granular scavenger material through pressurized container 500. In this aspect, each of the outlets 501 are configured to flow into a discharge line 503. Thus, as materials flow through pressurized container 500, they may contact one or more of baffles 502, divide into discrete streams, and then exit through a specific outlet 501 corresponding to one or more of baffles

502. Such an embodiment may allow for a more efficient transfer of material through pressurized container 500.

Referring now to FIG. 5C, a top schematic view of a pressurized container 500 according to one embodiment of the present disclosure is shown. In this embodiment, pressurized container 500 has a circular external geometry and a plurality of outlets 501 for discharging granular scavenger materials therethrough. Additionally, pressurized container 500 has a plurality of internal baffles 502 for directing a flow of material to a specific one of outlets 501. For example, as materials are transferred into pressurized container 500, the material may be divided into a plurality of discrete streams, such that a certain volume of material is discharged through each of the plurality of outlets 501. Pressurized container 500 having a plurality of baffles 502, each corresponding to one of outlets 501, may be useful in discharging granular scavenger materials from pressurized container 500.

Referring to FIG. 5D, a cross-sectional view of pressurized container 500 from FIG. 5C according to one aspect of the present disclosure is shown. In this aspect, pressurized container 500 is illustrated including a plurality of outlets 501 and a plurality of internal baffles 502 for directing a flow of granular scavenger materials through pressurized container 500. In this embodiment, each of the outlets 501 is configured to flow discretely into a discharge line 503. Thus, as materials flow through pressurized container 500, they may contact one or more of baffles 502, divide into discrete streams, and then exit through a specific outlet 501 corresponding to one or more of baffles 502. Such an embodiment may allow for a more efficient transfer of materials through pressurized container 500.

Because outlets 501 do not combine prior to joining with discharge line 503, the blocking of one or more of outlets 501 due to coalesced material may be further reduced. Those of ordinary skill in the art will appreciate that the specific configuration of baffles 502 and outlets 501 may vary without departing from the scope of the present disclosure. For example, in one embodiment, a pressurized container 500 having two outlets 501 and a single baffle 502 may be used, whereas in other embodiments a pressurized container 500 having three or more outlets 501 and baffles 502 may be used. Additionally, the number of baffles 502 and/or discrete stream created within pressurized container 500 may be different from the number of outlets 501. For example, in one aspect, pressurized container 500 may include three baffles 502 corresponding to two outlets 501. In other embodiments, the number of outlets 501 may be greater than the number of baffles 502.

Moreover, those of ordinary skill in the art will appreciate that the geometry of baffles 502 may vary according to the design requirements of a given pressurized container 500. In one aspect, baffles 502 may be configured in a triangular geometry, while in other embodiments, baffles 502 may be substantially cylindrical, conical, frustoconical, pyramidal, polygonal, or of irregular geometry. Furthermore, the arrangement of baffles 502 in pressurized container 500 may also vary. For example, baffles 502 may be arranged concentrically around a center point of the pressurized container 500, or may be arbitrarily disposed within pressurized container 500. Moreover, in certain embodiments, the disposition of baffles 502 may be in a honeycomb arrangement, to further enhance the flow of materials therethrough.

Those of ordinary skill in the art will appreciate that the precise configuration of baffles 502 within pressurized container 500 may vary according to the requirements of a transfer operation. As the geometry of baffles 502 is varied, the geometry of outlets 501 corresponding to baffles 502 may also be varied. For example, as illustrated in FIGS. 5A-5D, outlets 501 have a generally conical geometry. In other embodiments, outlets 501 may have frustoconical, polygonal, cylindrical, or other geometry that allows outlet 501 to correspond to a flow of granular scavenger material in pressurized container 502.

Figure 6A:
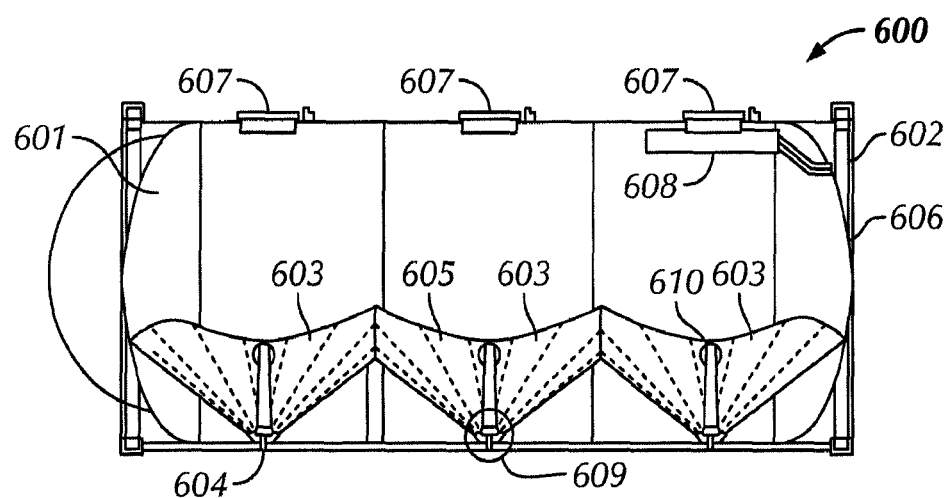
FIG. 6A illustrates a side view of a pressurized container according to embodiments of the present disclosure.
Figure 6B:
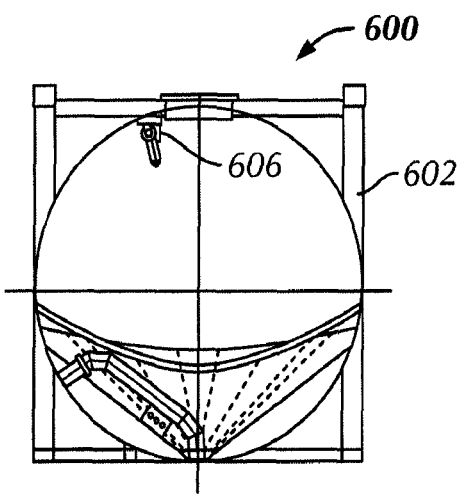
FIG. 6B illustrates an end view of a pressurized container according to embodiments of the present disclosure.

Referring now to FIGS. 6A through 6B, alternate pressurized containers according to aspects of the present disclosure are shown. Specifically, FIG. 6A illustrates a side view of a pressurized container, while FIG. 6B shows an end view of a pressurized container.

In this aspect, pressurized container 600 includes a vessel 601 disposed within a support structure 602. The vessel 601 includes a plurality of conical sections 603, which end in a flat apex 604, thereby forming a plurality of exit hopper portions 605. Pressurized container 600 also includes an air inlet 606 configured to receive a flow of air and material inlets 607 configured to receive a flow of materials, such as dry granular $H_2S$ scavenger material. During the transference of materials to and/or from pressurized container 600, air is injected into air inlet 606, and passes through a filtering element 608. Filtering element 608 allows for air to be cleaned, thereby removing dust particles and impurities from the airflow prior to contact with the material within the vessel 601. A valve 609 at apex 604 may then be opened, thereby allowing for a flow of materials from vessel 601 through outlet 610. Examples of horizontally disposed pressurized containers 600 are described in detail in U.S. Patent Publication No. 2007/0187432 to Brian Snowdon, and is hereby incorporated by reference.

Figure 7:
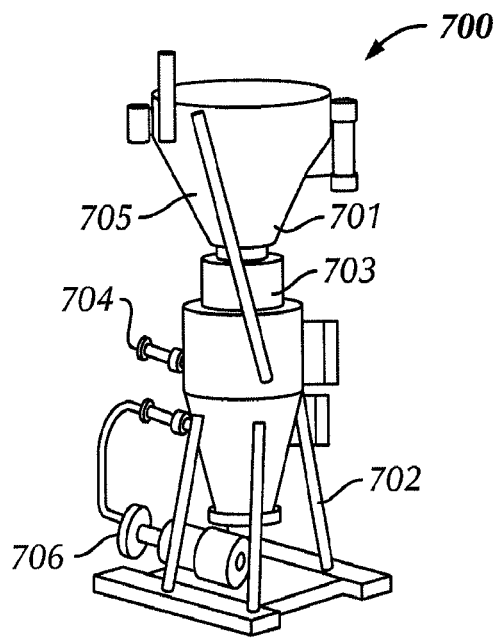
FIG. 7 shows a side view of a pneumatic transference device according to embodiments of the present disclosure.

Referring now to FIG. 7, a pressurized transference device, according to embodiments of the present disclosure, is shown. Pressurized transference device 700 may include a feed chute 701 through which granular scavenger material may be gravity fed. After the granular scavenger materials have been loaded into the body 702 of the device, an inlet valve 703 is closed, thereby creating a pressure-tight seal around the inlet. Once sealed, the body is pressurized, and compressed air may be injected through air inlet 704, such that the dry material in body 702 is discharged from the pressurized transference device in a batch. In certain aspects, pressurized transference device 700 may also include secondary air inlet 705 and/or vibration devices (not shown) disposed in communication with feed chute 701 to facilitate the transfer of material through the feed chute 701 by breaking up coalesced materials.

During operation, the pressurized transference device 700 may be fluidly connected to pressurized containers, such as those described above, thereby allowing granular scavenger materials to be transferred therebetween. Because the materials are transferred in batch mode, the materials travel in slugs, or batches of material, through a hose connected to an outlet 706 of the pressurized transference device. Such a method of transference is a form of dense phase transfer, whereby materials travel in slugs, rather than flow freely through hoses, as occurs with traditional, lean phase material transfer.

Figure 8:
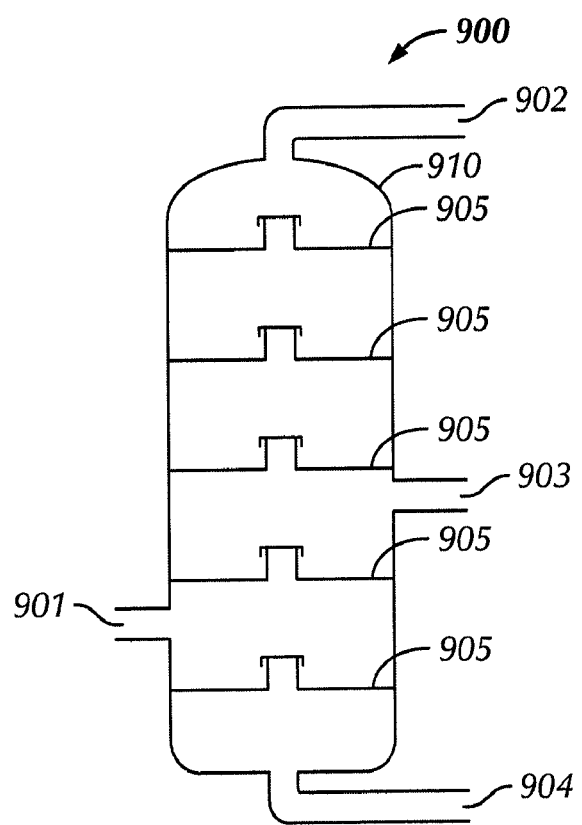
FIG. 8 shows a cross-sectional view of a reactor vessel according to embodiments of the present disclosure.

Referring to FIG. 8, a cross-sectional view of a reactor vessel is shown. In this embodiment, reactor vessel 900 functions to separate components such as condensate from natural gas and also to remove $H_2S$. Generally, gaseous hydrocarbons may flow through inlet 901 of the reactor vessel 900 up through horizontal membranes 905. As the gas travels through reactor 900, a temperature change may occur, and condensate may separate out of the gaseous phase. As condensate forms, it may be collected and transferred from outlet 903 to a storage tank (not shown), and the gas may continue to flow through outlet 902 to a storage tank (not shown) or a separator (also not shown). As the gas flows through horizontal membranes 905, the granular $H_2S$ scavenger materials absorb hydrogen sulfide from the gas stream. During this process, the scavenger material may become exhausted, and the process may result in the formation of a crystallized material within reactor vessel 900. When crystallization occurs, reactor 900 may require cleaning before continuing the $H_2S$ removal process.

As previously discussed, during the reactor cleaning phase, the reactor may be filled and circulated with a pressurized fluid that is drained though bottom outlet 904 and transferred to a tank cleaning system (not shown) for recycling. In other embodiments, the cleaning phase may include injection of a cleaning fluid or an inert gas, and as such, the cleaning phase may occur with or without a cleaning fluid present in reactor 900. After the reactor vessel 900 is cleaned and prepared for the next operation, the reactor 900 may be filled with fresh granular $H_2S$ scavenger materials supplied from pressurized containers (not shown) located proximate reactor 900. In one aspect, the reactor vessel 900 may include a vertical cylinder 910 with horizontal membranes 905 to filter the production gases returning from a well. Those of ordinary skill in the art will appreciate that the precise configuration of a reactor vessel may vary according to the requirements of the equipment that may be available.

Figure 9:
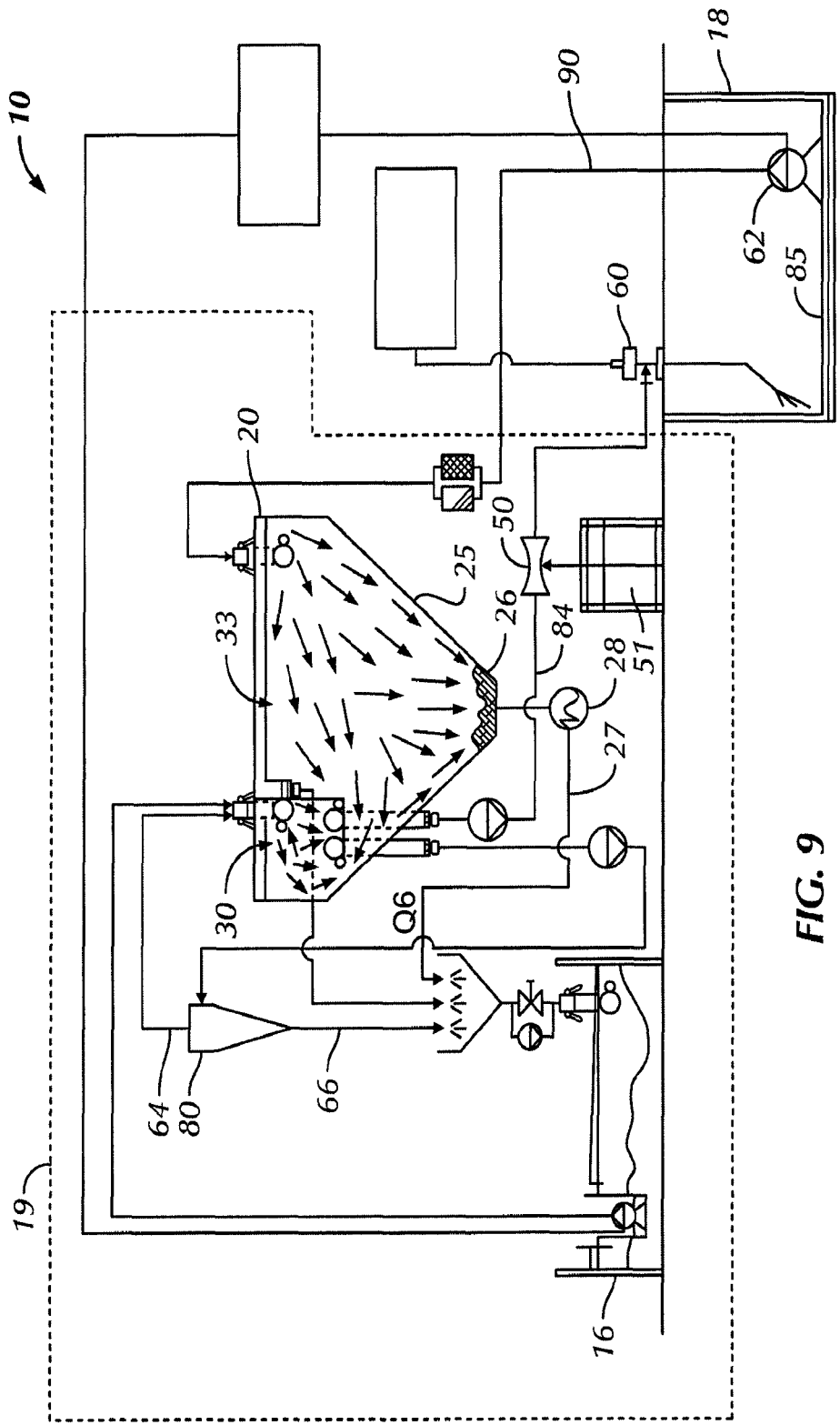
FIG. 9 shows a schematic representation of an automatic tank cleaning system according to embodiments of the present disclosure.

Referring to FIG. 9, a schematic representation of a tank cleaning system is shown. In this embodiment, tank cleaning system 10 includes a water recycling unit 19 and one or more rotary jet head washers 60. In one aspect, the rotary jet head washers 60 are lowered into the reactor 18 and positioned in the unit with brackets (not shown). As fluid exits the jet head 60, the reactor 18 is washed with pressurized fluid which dislodges solids present in the reactor 18, thus generating an unclean fluid 85. Through the use of a pump 62, the unclean fluid 85 may be pumped through tank line 90 to the water recycling unit 19 or through a manifold (not shown) that is designed with control valves.

The water recycling unit 19 may include a water recycling tank 20, a cuttings box 16, and a hydrocyclone 80. Additionally, the water recycling tank 20 may also include a sloped bottom 25, which may be round, squared, or rectangular. Solids 26 suspended in the fluid received from the reactor vessel may settle to the bottom of the water recycling tank 20, and then may be pumped by pump 28 to the cutting box 16 through a line 27 at a volumetric flow rate Q6, or alternatively, the solids may be released from the water recycling tank 20 by a valve (not shown) and pumped to the cutting box 16. Before the fluid exits the water recycling tank 20, to enter the clean water compartment 30 from dirty fluid compartment 33, the clean fluid may be pumped into one or more hydrocyclones 80. Smaller solids that may not settle out of the fluid may be removed by centrifugal force created by the hydrocyclone 80. As the small solids are separated from the fluid, the solids are directed through line 66 from the hydrocyclone 80 to the cuttings box 16 for disposal. The fluid recovered from hydrocyclone 80 is then pumped through line 64 to the clean water compartment 30. Through the use of rotary jet heads 60, clean fluid may be recycled and reintroduced to reactor 18 from the clean water compartment 30 via line 84 of the automatic tank cleaning system 10.

Those of ordinary skill in the art will appreciate that a wide variety of fluids may be used with the presently illustrated embodiments. Such fluids may include detergents, surfactants, antifoaming agents, suspending agents, lubricating agents (to reduce the wear caused by the flowing solids), and the like, to assist in the quick and efficient cleaning of a tank or vessel. A chemical inductor 50 may be used to add such cleaning chemicals 51 to the fluid. In another aspect, the water recycling tank 20 may act as a buffer tank to store and transfer clean water from a clean water compartment 30 to the reactor. An example of an automatic tank cleaning system is described in detail in U.S. Pat. No. 7,232,525, to M-I LLC, Houston, Tex., and hereby incorporated by reference.

In still other embodiments, vessels according to the present disclosure may be used to transport granular materials to and from offshore locations. Those of ordinary still in the art will appreciate that the apparatuses described below may be used to transport granular materials such as granular $H_2S$ scavenger material, such as a compressed iron oxide product sold under the name SULFATREAT XLP available from M-I SWACO. Granular $H_2S$ scavenger material tends to be relatively fragile.

Pneumatic conveying of this type of material has demonstrated that the material easily breaks apart, forming fine particles. Fine particles of granular $H_2S$ scavenger materials are undesirable as they act to prevent gas from flowing through the bed of material. For purposes of this disclosure, this granular $H_2S$ scavenger material will be discussed. It will be appreciated, however, that other granular materials may also be collected and transported in the described embodiments without departing from the scope of the invention.

Figure 10:
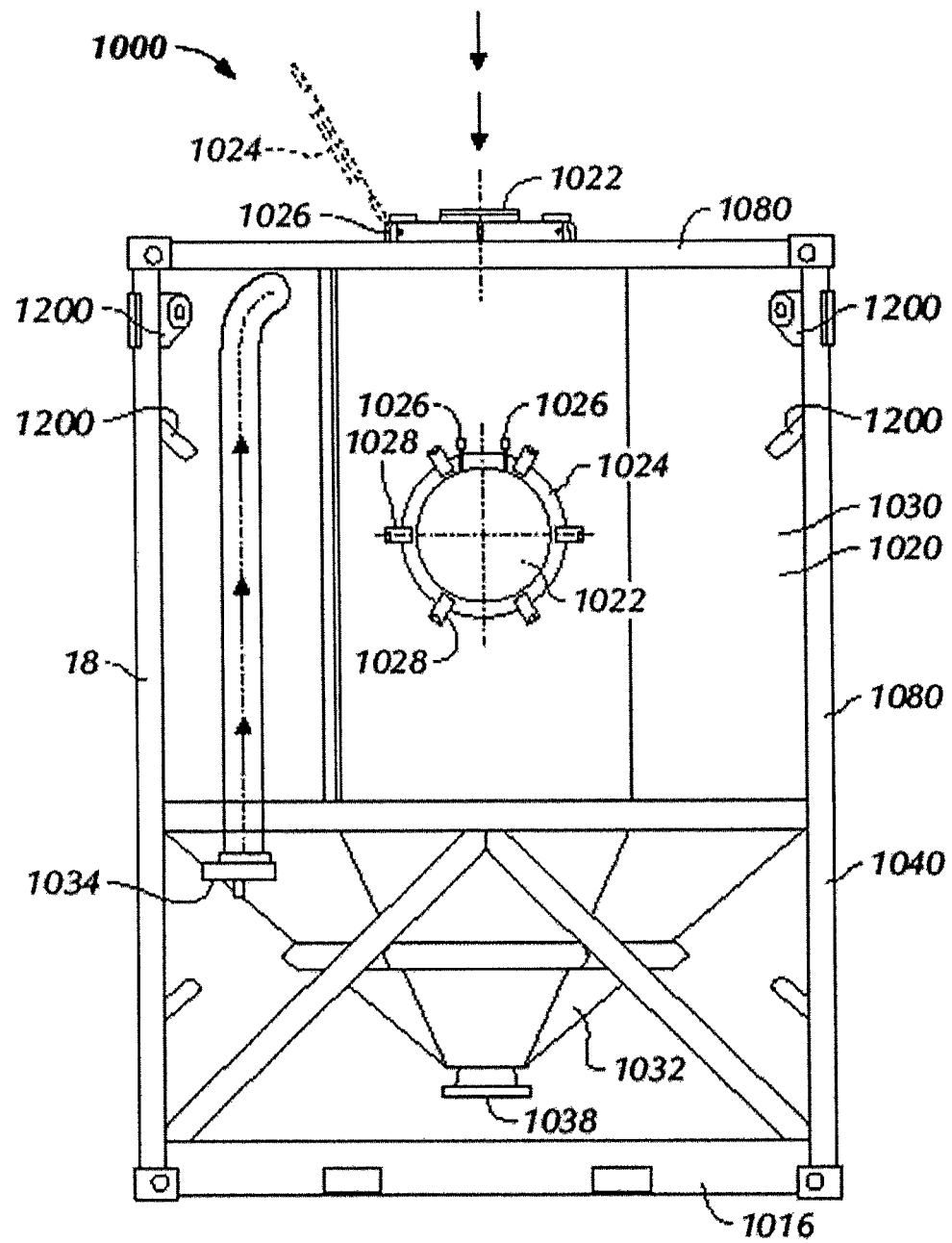
FIG. 10 is a front view of a vessel according to embodiments of the present disclosure.
Figure 11:
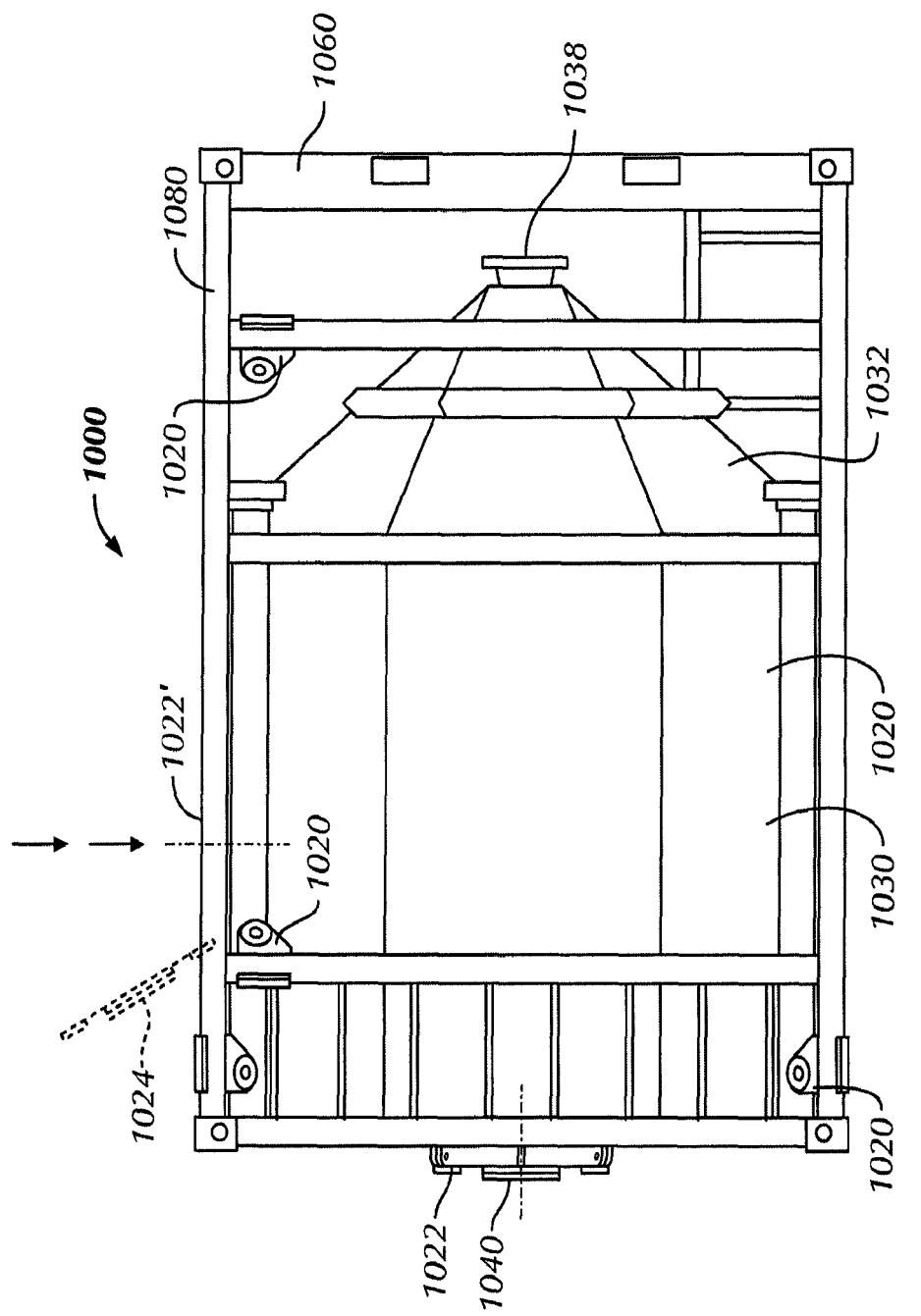
FIG. 11 is a front view of a vessel according to embodiments of the present disclosure.

FIG. 10 shows a vessel 1000 for collecting and transporting material. The vessel includes a tank 1020 that is coupled to a support structure 1040. The support structure 1040 includes a base 1060 and a plurality of support members 1080 affixed to the base 1060. The tank 1020 is affixed to the support members 1080. Additional cross support members may be included to support the tank. The base 1060 may include a forklift pallet base so that the vessel 1000 can be moved with a fork truck. Lifting eyes 1200 may be included at various locations on support members 1080 so that vessel 1000 can be moved with a lifting appliance (not shown), such as a crane. The lifting eyes 1200 may be located so that vessel 1000 can be moved in an upright position or on its side, as shown in FIG. 11 as well as rotated between the two positions. Further, lifting eyes 1200 can be used to load or unload vessel 1000 onto or off of an offshore rig (not shown). Additionally, the support members 1080 may include pockets that may also be used to move vessel in horizontal orientation with a fork truck. Those of ordinary skill in the art will appreciate that the lifting eyes 1200 may be in various locations so as to facilitate movement of vessel 1000.

Figure 12:
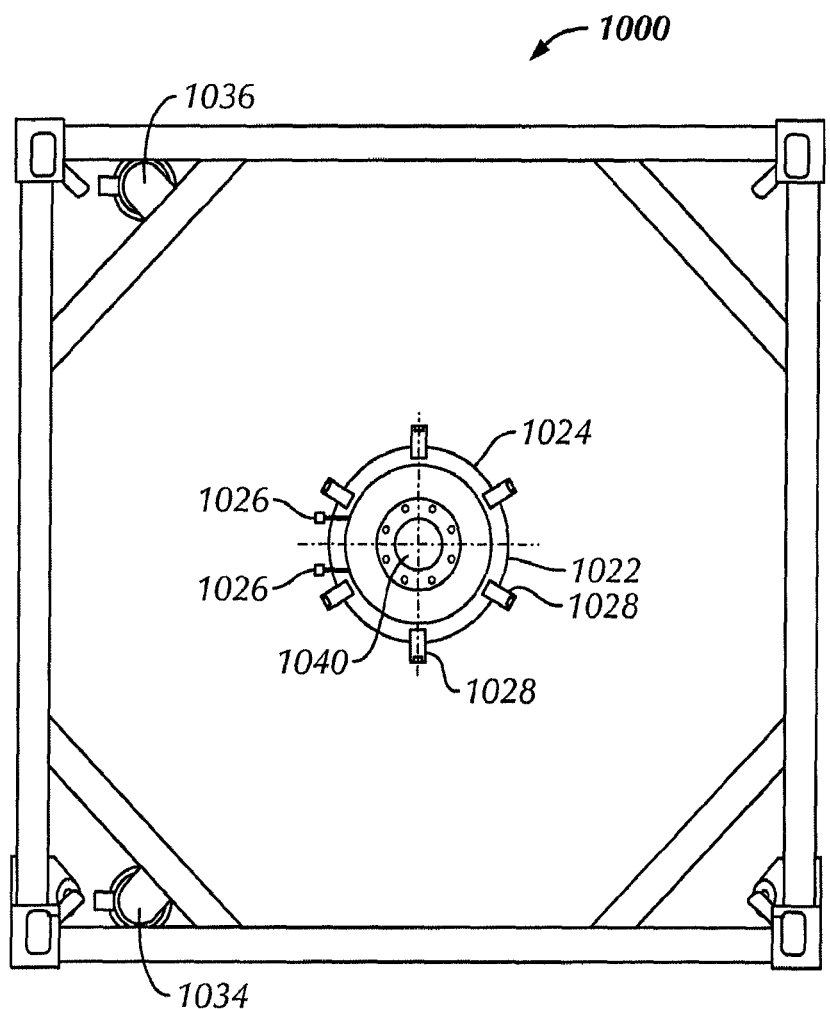
FIG. 12 is a top view of a vessel according to embodiments of the present disclosure.

The tank 1020 may have various shapes, configurations and sizes. In the embodiments shown in FIGS. 10-12, the tank 1020 has a straight section 1030 and an angled section 1032. The straight section 1030 may be cylindrical or have a plurality of wall segments defining a storage area such as that shown best by FIG. 12. Referring again to FIG. 10, angled section 1032 may be conical or formed from a plurality of wall segments in an angled configuration. The angled section 1032 has a shape to facilitate the flow of material between the tank 1020 and other processing and/or transfer equipment (not shown).

The tank 1020 includes a plurality of gravity feed inlets 1022, 1022' for receiving granular material. A cover 1024 is located over each gravity feed inlet 1022, 1022'. The cover 1024 is provided with hinges 1026 so that the cover is retained to the tank 1020 and may be selectively opened to provide access to the inlet 1022 or 1022' or closed so the inlet 1022 or 1022' is sealed. One or more clamps 1028 may be provided to retain the cover 1024 over the inlet 1022 or 1022'.

As previously discussed, vessel 1000 may be oriented in an upright position as shown in FIG. 1 or on a side as shown in FIG. 11. Inlet 1022 is located on an end of tank 1020 so that when vessel 1000 is oriented in an upright position, as shown in FIG. 10, material may be fed into tank 1020 through inlet 1022 using gravity. Likewise, Inlet 1022' is located on a side of tank 1020 so that when vessel 1000 is oriented on a side, as shown in FIG. 11, material may be fed into tank 1020 through inlet 1022' using gravity.

Tank 1020 also includes vent pipes 1034 and 1036 for receiving bulk granular material and for evacuating air to the atmosphere during transference.

Tank 1020 further includes an outlet 1038 through which bulk granular material may exit tank 1020. The outlet 1038 may be connected to flexible hosing, thereby allowing pressurization of the tank 1020 and pneumatic conveyance of the bulk granular material. Alternatively, outlet 1038 may be connected to a filling sock (not shown) for gravity removal of the bulk granular material.

Pneumatic conveyance of bulk granular material into or out of tank 1020 involves the use of pressure sufficient to convey the material. As such, tank 1020 is constructed of a material sufficient to hold the pressure without structural failure. A rupture disk 1040 may be located in the tank 1020 to protect the integrity of the tank 1020 if there are issues during venting of the conveying air. The rupture disk 1040 may be located on the gravity feed inlet 1022.

During operation, granular $H_2S$ scavenger material may be loaded onshore into vessel 1000 using gravity feed. Bags or drums of material may be poured into tank 1020 through inlet 1022 or 1022' depending on the orientation of vessel 1000 as previously described. The vessel 1000 may then be lifted onto a supply boat (not shown) for transport to the production site. The new material contained in tank 1020 may be extracted from the tank 1020 through outlet 1038 using gravity, pneumatic discharge, or vacuum extraction. A hose (not shown) may be connected to outlet 1038 and material removed from tank 1020 using a system and method similar to that described in U.S. Pat. No. 6,179,071 pertaining to cuttings. Alternatively, the new material may be released through outlet 1038 using gravity. When releasing the new $H_2S$ scavenger material using gravity feed, a filling sock (not shown) may be connected to outlet 1038 to help control the loading of the new material to its destination.

Spent $H_2S$ scavenger material may be extracted from an offshore reactor and pneumatically conveyed into tank 1020 through pneumatic inlets 1034 and/or 1036. Because the spent material is already used, the efficacy of the material as it relates to particle size is not of concern.

Advantageously, embodiments of the present disclosure may allow for the transference of granular $H_2S$ scavenger materials between land-based facilities and supply vessels in a more efficient manner. In such embodiments, the pneumatic transfer of granular scavenger materials using pressurized containers prevents potential hazards from the use of cranes, and lifting boxes and/or bags of scavenger materials. Because lifting boxes or bags of granular scavenger material may result in personnel being caught between the boxes or bags, boxes or bags falling during crane lifts, trip hazards from having the boxes or bags on supply vessels, and crane lift errors, embodiments disclosed herein my provide a safer method of transferring granular scavenger. Additionally, the use of pneumatic transference may decrease the number of crane lifts necessary to transfer granular scavenger material from a land-based facility to a supply boat. Even if pressurized containers are lifted onto a supply boat from a land-based facility, the number of crane lifts will be less than transferring a number of box or bags of granular scavenger material equaling the same volume. Thus, using pressurized containers in the transport of granular scavenger material from land-based facilities to vessel, between multiple vessels, and between vessels and a production platform may provide safer and more efficient transfer methods.

Embodiments of the present disclosure may also allow for the transference of fragile granular $H_2S$ scavenger materials between land-based facilities and supply vessels in a manner that reduces the degradation of the material as compared to pneumatically filling the vessel with the material. Thus the material integrity is preserved and the material is conveyed to the reactor vessel without becoming clogged in the transfer lines.

Also advantageously, spent granular $H_2S$ scavenger material may be pneumatically conveyed from the reactor to the vessel for transfer back onshore. Thus, the same vessel may be used to transport unspent $H_2S$ scavenger material to an offshore location and spent $H_2S$ scavenger material from an offshore location to another location for processing and/or disposal, thereby reducing the overall number of containers required to achieve this objective.

Also advantageously, a wide variety of fluids and granular materials may be used with the presently illustrated embodiments. Such materials may include, for example, dried cuttings, proppant, drilling fluid additives and weighting agents.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method comprising:
providing a vacuum system disposed at a hydrocarbon production site to remove spent granular material from a reactor;
transferring the spent granular material through the vacuum system into a pressurized transference device;
conveying, through a first positive pneumatic transfer, the spent granular material from the pressurized transference device to a first pressurized vessel; and
conveying, through a second positive pneumatic transfer, the spent granular material from the first pressurized vessel to a second pressurized vessel.

2. The method of claim 1, wherein the second pressurized vessel is disposed on a transport vessel.

3. The method of claim 1, wherein the spent granular material is transferred pneumatically in dense phase.

4. The method of claim 1, wherein the granular material is transferred pneumatically in lean phase.

5. The method of claim 1, wherein the first pressurized vessel is disposed on an offshore production site.

6. The method of claim 1, wherein the spent material is granular H2S scavenger material.

7. A method comprising:
providing a first pressurized vessel containing granular scavenger material;
connecting the first pressurized vessel to a second vessel; and
transferring pneumatically, via compressed air, the granular scavenger material through a plurality of baffles corresponding to complementary outlets in the first pressurized vessel to the second vessel.

8. The method of claim 7, wherein the second vessel comprises a pressurized vessel.

9. The method of claim 8, wherein the first pressurized vessel is configured to transfer the granular scavenger material from the first pressurized vessel to the second pressurized vessel as a dense phase.

10. The method of claim 7, wherein the first pressurized vessel is configured to transfer the scavenger material from the first pressurized vessel to the second pressurized vessel as a lean phase.

11. The method of claim 8, further comprising:
transferring, via compressed air, the granular scavenger material from the second pressurized vessel to a reactor.

12. The method of claim 11, wherein the second pressurized vessel is disposed on a transport vessel.

13. The method of claim 8, wherein a third pressurized vessel is disposed on a production platform and is configured to pneumatically transfer, via compressed air, the granular scavenger material from the second pressurized vessel to the third pressurized vessel.

14. The method of claim 1, further comprising conveying the spent granular material through a plurality of baffles corresponding to complementary outlets in at least one of the first pressurized vessel and the second pressurized vessel.

15. The method of claim 1, wherein the second pneumatic transfer comprises transferring the spent granular material through a lower angled section of the first pressurized vessel into the second pressurized vessel.

16. The method of claim 1, further comprising transferring the spent granular material from the vacuum system to an inlet disposed on an upper portion of the pressurized transference device.

17. The method of claim 7, wherein the second vessel comprises a plurality of baffles corresponding to complementary outlets therein.

18. The method of claim 7, further comprising conveying the granular scavenger material through a lower angled section of the first pressurized vessel into the second vessel.

19. The method of claim 7, wherein the first pressurize vessel is connected to an inlet disposed on an upper portion of the second vessel.

20. The method of claim 7, further comprising conveying the granular scavenger material from a land based facility into the first pressurized vessel, and
transporting the first pressurized vessel with a transport vessel to an offshore production site.

* * * * *